Figure 1:
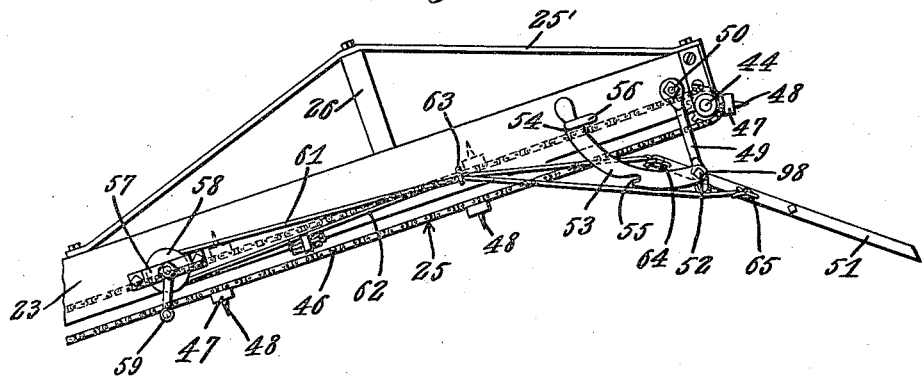

June 19, 1923.                H. F. VON ENGELN                1,459,271
                              WHEAT STACKER Original Filed June 1, 1918

H. F. Von Engeln, Inventor

Witness

By C. A. Snow & Co.
                        Attorneys

Patented June 19, 1923.

1,459,271

UNITED STATES PATENT OFFICE.

HARRY F. VON ENGELN, OF LUDELL, KANSAS.

WHEAT STACKER.

Original application filed June 1, 1918, Serial No. 237,741. Divided and this application filed March 8, 1920. Serial No. 363,958.

*To all whom it may concern:*

Be it known that I, HARRY F. VON ENGELN, a citizen of the United States, residing at Ludell, in the county of Rawlins and State of Kansas, have invented a new and useful Wheat Stacker, of which the following is a specification.

It is the object of this invention to provide novel means for controlling a chute located at the upper end of an inclined frame carrying a conveyor.

The structure shown in this application has been divided out of my application for Letters Patent on a wheat stacker, Patent No. 1,336,005, issued on April 6, 1920.

But one form of the invention is shown, and it is to be understood that many changes falling within the skill of a mechanic and comprehended within the scope of what is claimed, may be made without departing from the spirit of the invention or jeopardizing the utility of the device hereinafter described.

In the drawings:—

Figure 2:
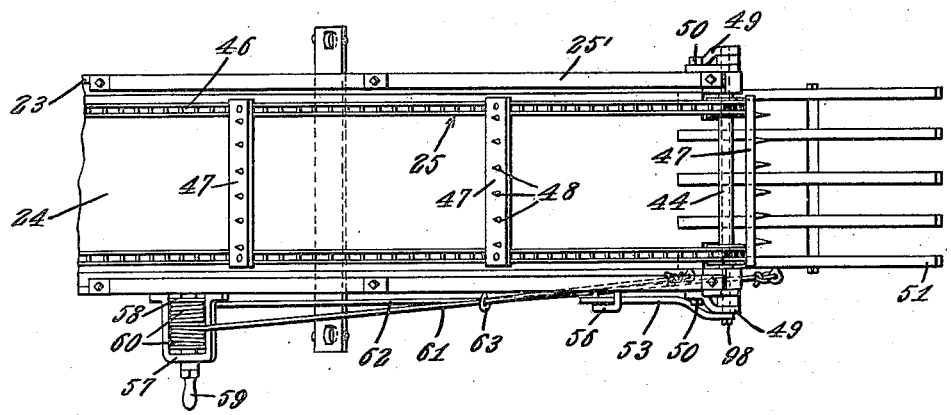

Figure 1 shows in side elevation, a portion of a conveyor frame whereunto the device forming the subject matter of this application has been applied; and Figure 2 is a top plan of the structure shown in Figure 1.

The numeral 23 marks a support, in the form of a main conveyor frame including a bottom 24, the main conveyor frame being inclined with respect to the horizontal, and being carried by a truck, (not shown). Adjacent to its forward end, the frame 23 is reinforced by trusses 25' and struts 26. A shaft 44 is journaled in the forward end of the frame 23 and about the shaft 44, a main conveyor 25, cooperating with the bottom 24 of the frame 23, is trained. The conveyor 25 includes chains 46, slats 47, and spurs 48 carried by the slats.

Hangers 49 are pivoted at 50 to the forward end of the frame 23. A chute 51 of any desired form is disposed between the hangers 49. A brace 53 is mounted to swing on a pivot member 98 carried by one of the hangers 49, the brace having an upper seat 54 and a lower seat 55, adapted to be engaged one at a time with a keeper 56 on the frame 23. As indicated by the reference numeral 52, the chute 51 is pivotally mounted, intermediate its ends, by means of the member 98, on the lower ends of the hangers 49. A bracket 57 is carried by the frame 23 at some distance from the forward end of the frame 23, and in the bracket a drum 58 is journaled, the drum being controlled by a crank 59. Flexible elements 61 and 62 are engaged with the drum as shown at 60, the flexible elements being trained through a fairleader 63 on the frame 23. The flexible element 61 is connected at 64 with the upper end of the chute 51, the flexible element 62 being connected at 65 with the lower portion of the chute. In other words, the flexible elements 61 and 62 are attached to the chute 51 on opposite sides of the pivotal mounting 52 of the chute 51.

The load on the conveyor 25 is delivered upon the chute 51, from which the load slides onto the stack, the structure hereinbefore described constituting a part of a stacking device. The angle of the chute 51 with respect to the horizontal may be varied by rotating the drum 58 through the instrumentality of the crank 59, one of the flexible elements 61 and 62 being reeled upon the drum, and the other flexible element being paid off the drum, the chute being tilted on the hangers 49. Since the drum 58 is at considerable distance from the chute 51, an operator who is standing on the ground may manipulate the chute, thereby relieving the person who is on the stack. It is possible to disengage the seat 54 of the brace 53 from the keeper 56 to engage the seat 55 with the keeper, to haul in the flexible element 62, and to pay out the flexible element 61, the hangers 49 swinging rearwardly, and the lower end of the chute swinging rearwardly, the chute thus being disposed in an out of the way position beneath the frame 23.

Having thus described the invention, what is claimed is:—

In a device of the class described, a support, a keeper on the side of the support, a hanger pivoted to the side of the support, a rigid brace detachably interengaged with the keeper, a chute, a pivot member uniting one end of the brace and the intermediate portion of the chute with the hanger, a drum journaled on the side of the support, flexible elements trained in opposite directions about the drum and connected with the chute on opposite sides of the pivot member, and a fair leader on the side of the support, the flexible elements passing through the fair leader, and the fair leader serving to hold the flexible elements clear of the brace.

In testimony that I claim the foregoing as my own, I have hereto affixed my signature in the presence of two witnesses.

HARRY VON ENGELN.

Witnesses:
VICTOR J. KUNSCH,
BERTHA VON ENGELN.